(12) United States Patent
Anderle et al.

(10) Patent No.: US 9,731,436 B2
(45) Date of Patent: *Aug. 15, 2017

(54) BLENDED FIBER PAD

(71) Applicants: Mary Anderle, Highlands Ranch, CO (US); David A. Rauch, New Haven, IN (US)

(72) Inventors: Mary Anderle, Highlands Ranch, CO (US); David A. Rauch, New Haven, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/349,097

(22) Filed: Nov. 11, 2016

(65) Prior Publication Data

US 2017/0057126 A1 Mar. 2, 2017

Related U.S. Application Data

(63) Continuation-in-part of application No. 14/473,016, filed on Sep. 22, 2014, now Pat. No. 9,527,227.

(51) Int. Cl.

| | |
|---|---|
| *B29C 43/00* | (2006.01) |
| *B29C 43/52* | (2006.01) |
| *D04H 1/4266* | (2012.01) |
| *D04H 1/54* | (2012.01) |
| *B29C 43/24* | (2006.01) |
| *D04H 1/02* | (2006.01) |
| *D04H 1/55* | (2012.01) |

(Continued)

(52) U.S. Cl.
CPC ............ *B29C 43/003* (2013.01); *B29C 43/24* (2013.01); *B29C 43/34* (2013.01); *B29C 43/52* (2013.01); *D01G 21/00* (2013.01); *D04H 1/02* (2013.01); *D04H 1/4266* (2013.01); *D04H 1/54* (2013.01); *D04H 1/55* (2013.01); *B29C 43/46* (2013.01); *B29C 2793/009* (2013.01); *B29K 2067/00* (2013.01); *B29K 2089/00* (2013.01); *B29K 2105/12* (2013.01)

(58) Field of Classification Search
None
See application file for complete search history.

(56) References Cited

U.S. PATENT DOCUMENTS

| | | | |
|---|---|---|---|
| 6,305,920 B1 * | 10/2001 | Kean ........................ | D04H 1/72 264/122 |
| 2006/0024470 A1 * | 2/2006 | Heilman .................. | B68G 1/00 428/74 |

(Continued)

*Primary Examiner* — Mary F Theisen
(74) *Attorney, Agent, or Firm* — Edwin H. Crabtree; Ramon L. Pizarro (57) ABSTRACT

A system for creating a blended fiber pad made from a mixture of alpaca fiber and a selected fiber. The fiber pad is used for bedding products, cushions, toppers and furniture. The system includes a washing station for cleaning and processing the fiber mixture and a pad forming machine. The washing station is used to thoroughly wash, clean and dry the alpaca fiber and the selected fiber. The washing station includes a series of wash tanks, squeeze pads and drying racks. The dried alpaca fiber and dried selected fiber are then baled and fed into the pad forming machine. The pad forming machine includes a plurality of individual sections with a series of conveyor belts. The conveyor belts are used for conveying the fiber mixture and a bond material from one station to the next and creating a finished blended fiber pad.

20 Claims, 5 Drawing Sheets

(51) Int. Cl.
*D01G 21/00* (2006.01)
*B29C 43/34* (2006.01)
B29K 67/00 (2006.01)
B29C 43/46 (2006.01)
B29K 105/12 (2006.01)

(56) References Cited

U.S. PATENT DOCUMENTS

2006/0208387 A1* 9/2006 Zodl ..................... C08J 5/045
  264/122
2009/0305593 A1* 12/2009 Schiavi ................ D04H 1/4266
  442/327

* cited by examiner

BLENDED FIBER PAD

This application is Continuation-In-Part, non-provisional patent application claiming the benefit of the subject matter and filing date of a Parent patent application, Ser. No. 14/473,016, filed on Sep. 22, 2014, by the subject inventors, and having a title of "Method and System for Making an Alpaca Bonded Fiber Pad."

BACKGROUND OF THE INVENTION (a) Field of the Invention

This invention relates to the making of a blended fiber pad and more particularly to a method and system for making the blended fiber pad using a combination of cleaned and processed alpaca fiber mixed with a selected fiber and a low melt bond.

(b) Discussion of Prior Art

Heretofore, there have been various methods and systems used for making pads, mattresses, cushions, toppers, furniture, and bedding products using cotton, wool, synthetic materials and like products. None of these prior art items provide the unique features and advantages of using a combination of a selected fiber with an alpaca fiber for making a blended fiber pad as disclosed herein.

SUMMARY OF THE INVENTION

In view of the foregoing, it is a primary objective of the subject invention to provide a high quality blended fiber pad made of alpaca fiber and a selected fiber and cut to size and received inside a pad cover for consumer use. The selected fiber can be a natural animal fiber, a natural plant fiber or a man-made filament fiber.

The subject invention includes a system having a combination alpaca fiber and a fiber washing station. The washing station is used for cleaning and processing the fibers and a pad forming machine. The washing station is used to thoroughly wash, clean and dry the combination of fibers. The washing station includes a series of wash tanks, squeeze pads and drying racks. The dried combination of fibers is then baled and fed into the pad forming machine.

The system also includes a pad forming machine having a plurality of individual sections with a series of conveyor belts. The conveyor belts are used for conveying the combination of the alpaca fiber and the selected fiber from one station to the next and creating the finished blended fiber pad.

The sections of the pad forming machine include an initial blending section for introducing and blending a low melt bond material with the alpaca fiber and the selected fiber and downstream creating the pad of blended fibers. A long fiber opener section is used for mechanically stretching or opening the fibers in the pad. Next, a stacking section is used for storing the fibers in a non-compressed state. A pad compression section is then used for adjusting the thickness and fullness of the fibers and creating a pad that's consistent in weight and size. An oven section of the machine is now used for heating and activating the low melt bond material with the combination of fibers and creating a continuous blended fiber pad. A compression and cooling section is then used to chill the pad for locking the pad into a correct height and blowing cool air through the pad to eliminate any false loft. A final product cutting section now cuts the pad to a desired length and width for providing different sizes of pads.

The combination of the alpaca fiber and selected fiber can now be quilted, used as a filling pad, or used in conjunction with other products such as furniture, box springs, cushions, bedding foam, toppers, mattresses and other sleeping surfaces.

These and other objects of the present invention will become apparent to those familiar with the making of different types of pad or rolls when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for a practical application of the making of the alpaca fiber pad, and in which.

DETAILED DESCRIPTION OF THE PREFERRED EMBODIMENTS

Figure 1:
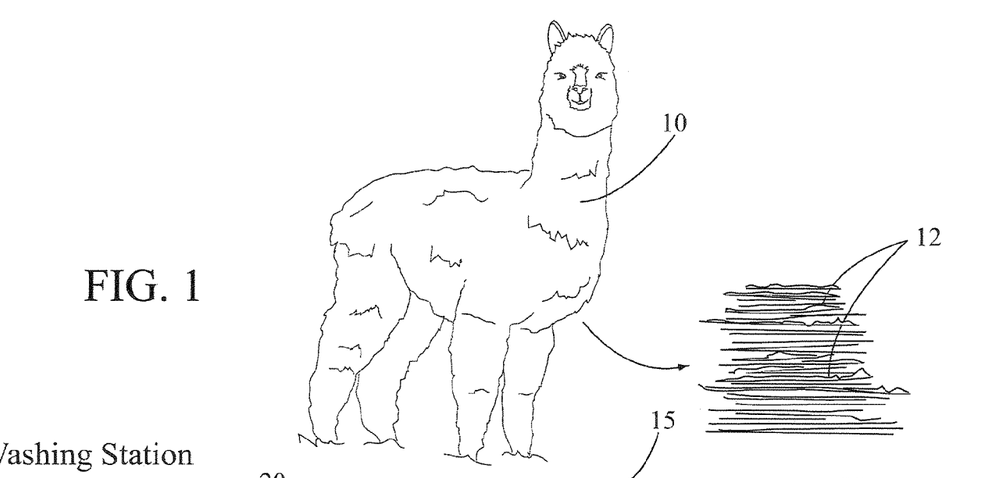
FIG. 1 is a drawing of an alpaca and alpaca fiber sheared from the animal and mixed with a selected fiber.

In FIG. 1, an alpaca 10 is shown with a portion of alpaca fiber sheared from the animal. The alpaca fiber is mixed with a selected natural fiber. The combination of fibers as a mixture is illustrated in the drawings as numeral 12.

It is important to point out, this application's parent application, Ser. No. 14/473,016, discloses a method and system of making an alpaca bonded fiber pad using exclusively alpaca with a low melt bonding fiber. In this CIP application, the alpaca fiber is mixed with a selected fiber. The fiber can be from a class of natural animal fibers, natural plant fibers, or man-made filament fibers. The mixture or combination of fibers can be in a range of 10 to 90 percent alpaca fibers or in a range of 10 to 90 percent natural fibers.

The low melt bond material can be added to the mixture in a range of 5 to 15 percent. Also, the low melt bond material can be made of a polyester fiber or similar material. As an example, the blended fiber pad can be made of up 45 percent alpaca fibers and 45 percent natural fibers, with 10 percent low melt bond material. Obviously, various percentages of the alpaca fibers and natural fibers can be used to make up a selected end product.

In this disclosure, the alpaca fiber can be mixed with natural animal fibers, such as angora, camel, cashmere, llama, mohair, silk, vicuna, wool or yak. Also, the alpaca fiber can be mixed with selected natural plant fibers, such as bamboo, cotton, hemp, jute, kenaf, sisal, flax, linen or ramie. Further, the alpaca fiber can be mixed with man-made filament fibers, such as acrylic, nylon, polyester, lyocell, rayon or viscose.

Figure 2:
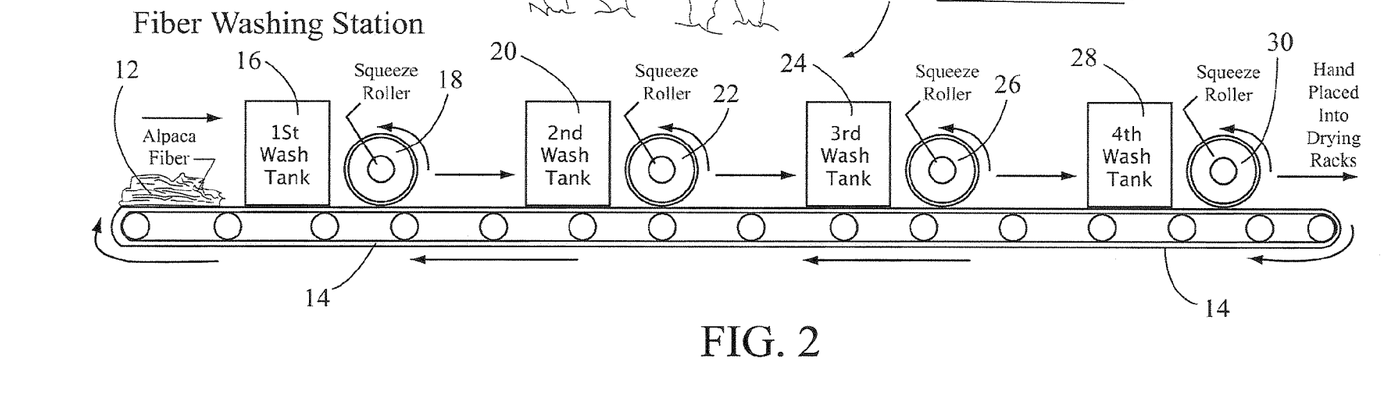
FIG. 2 illustrates the alpaca fiber mixed with the selected fiber in a washing station. The station used for cleaning, processing and drying the combination of fibers.

In FIG. 2, the fiber mixture 12 is shown received on a washing station conveyor belt 14, which is part of a fiber washing station. The washing station is shown having general reference numeral 15. The station 15 includes a first wash tank 16 for washing the fiber 12 in 130 degree F. water with a detergent. The fiber mixture 12 is then rinsed and squeezed using a squeeze roller 18. To complete the washing of the mixture 12, a second wash tank 20 and second squeeze roller 22, a third wash tank 24 and third squeeze roller 26, and a fourth wash tank 28 and fourth squeeze roller 30 can be used to thoroughly clean the mixture 12 prior to being dried on drying racks. The drying racks are not shown in the drawings. Obviously, any number of wash tanks and squeeze rollers can be used to completely wash and clean the fiber mixture 12.

In FIGS. 3-10, various sections of a pad making machine are illustrated and used for making the mixture 12 of alpaca fibers and selected fibers, as mentioned above. The machine is shown having a general reference numeral 32.

Figure 3:
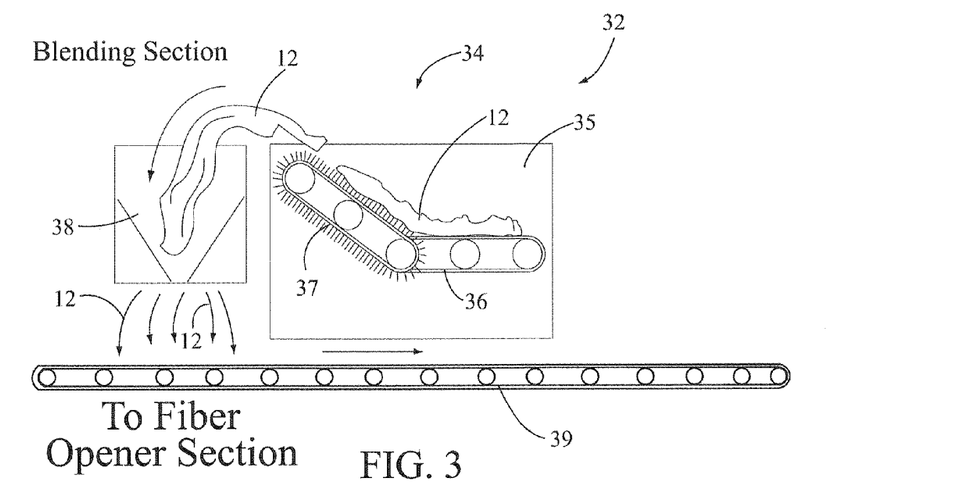
FIG. 3 illustrates a portion of a blending section of a pad forming machine. This portion of the blending section is used for conveying the combination of fibers into a hopper for blending with a low melt bonding material.

In FIG. 3, a blending section is shown having general reference numeral 34. The blending section 34 includes two or more blending housings 35 for tumbling and mixing the cleaned mixture 12 with a low melt bond material 40. The blending housing 35 includes a wood slat conveyor belt 36 for tumbling and moving the cleaned fiber mixture 12 upwardly onto an angled spiked apron conveyor 37. The mixture 12 is then dropped into a weighing pan and blending hopper 38 and discharged onto a blending section conveyor 39.

Figure 4:
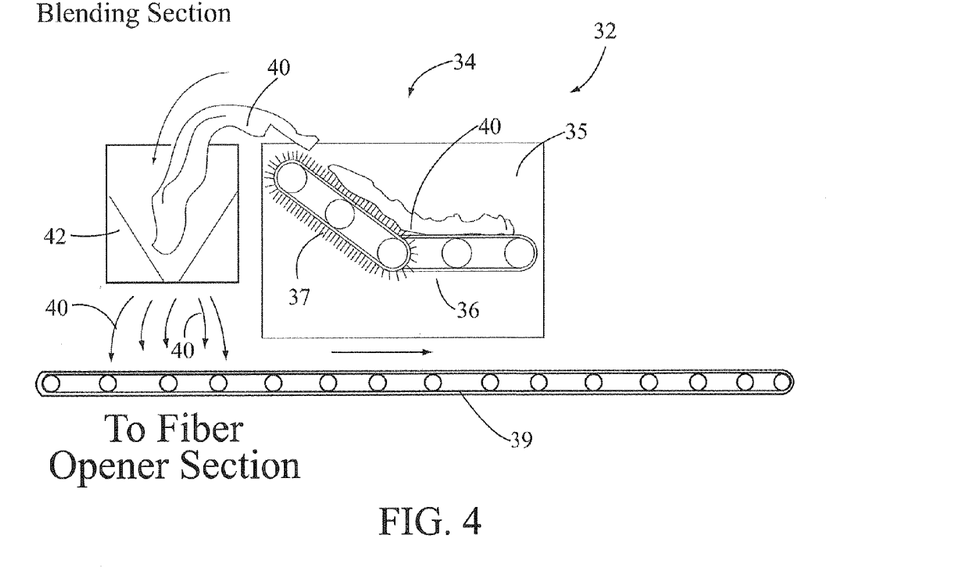
FIG. 4 shows another portion of the blending section used for conveying the low melt bonding material into a hopper and then onto a conveyor belt for blending with the combination of fibers.

In FIG. 4, another blending housing 35 is shown with a wood slat conveyor belt 36 for moving a low melt bond material 40 onto an angled spiked apron conveyor 37. The fiber 40 is then dropped into a weighing pan and blending hopper 38 for measuring the amount of the bond material 40 prior to being dropped onto the conveyor belt 39 and mixed with the fiber mixture 12. Typically, the amount of bond material 40 to the mixture 12 is 10 percent of the total volume, although the amount can range from 5 to 15 percent.

In practice, the blending section 34 can include five blending housings 35 for holding various percentages of mixture 12 and bond material 40. For example, 20 ounces of fiber mixture 12 can be held in a first three of the housings 35, 10 ounces of bond material in a fourth housing 35 and 10 ounces of fiber mixture 12 in a fifth housing 35. Obviously various combinations and amount of the fiber mixture 12 and bond material can be mixed together depending on the weight and density of the finished bonded fiber pad desired.

Figure 5:
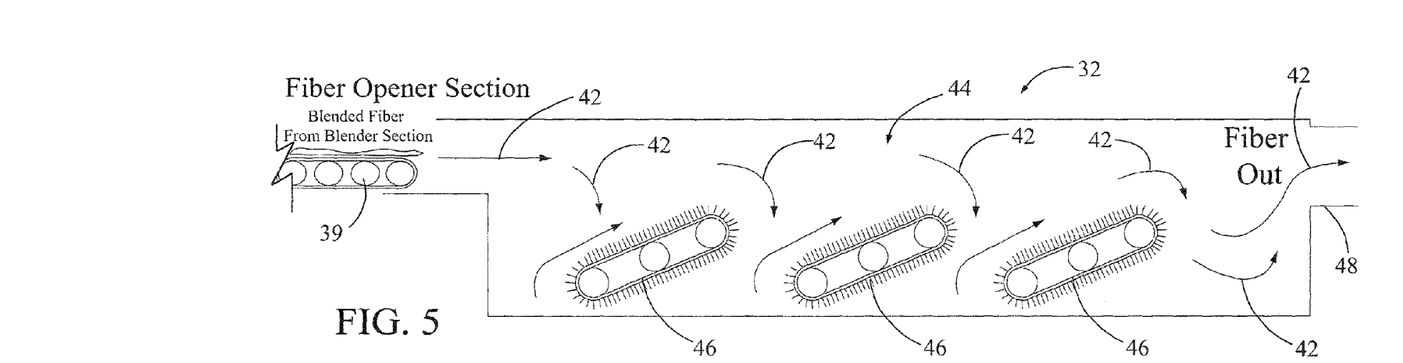
FIG. 5 illustrates the blended fibers introduced into a fiber opener section for stretching the mixtures of fibers.

In FIG. 5, a blended mix of fiber mixture 12 and bond material 40, shown as arrows 42, is introduced into a fiber opener section for stretching the alpaca fibers. The opener section is shown having general reference numeral 44. The opener section 44 is used to mechanically stretch or open the fibers 42 using a series of spiked and gauged opener conveyor belts 46. The belts 46 are used to stretch and rip open the fiber mixture 12 for dropping out any entrained dirt and debris left therein and not previously removed in the washing station 15. The fibers 42 are then blown through duct work 48 to a stacking section of the pad making machine 32.

Figure 6:
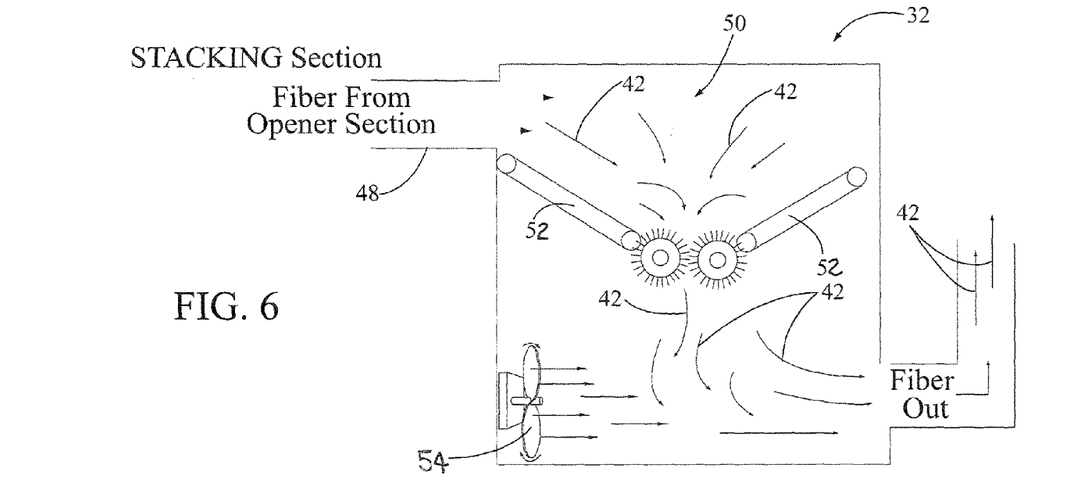
FIG. 6 shows the fiber pad introduced into a stacking section used for storing the fiber blend in a non-compression state and then blown out in the section using a fan.

In FIG. 6, the blown, blended mixture of fibers 42 are introduced into a stacking section used for storing the mixture of fibers in a non-compression state. The stacking section is shown having general reference numeral 50. The stored fibers 42 are then, using a pair of downwardly slanted forming conveyor belts 52, pushed and packed against the belts. The fibers 42 are then blow out of the section 50 using a fan 54.

Figure 7:
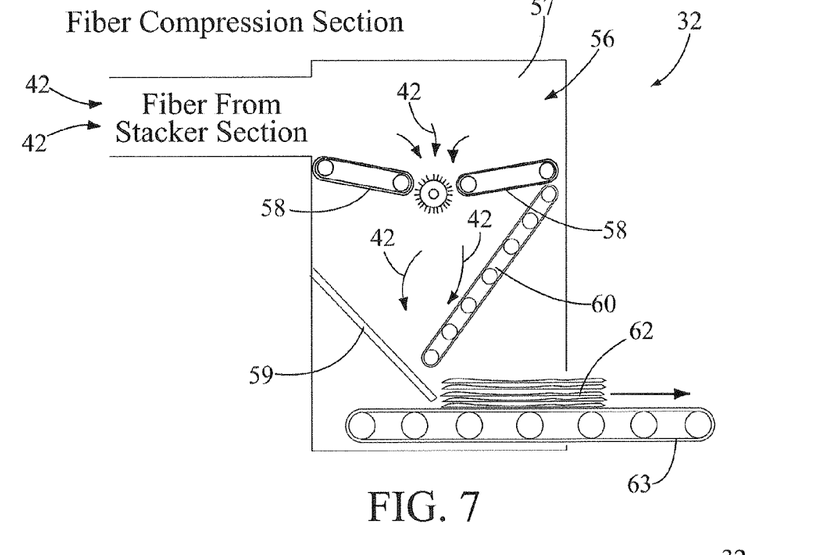
FIG. 7 illustrates the blown fiber received inside a pad compression section, which is used to adjust the thickness and fullness of a newly created blended fiber pad.

In FIG. 7, the blown fibers 42 are shown received inside a fiber compression section, having a general reference numeral 56, and blown into a top of a holding box 57. The blended, mixture of fibers 42 is then pinched through a pair of compression rollers 58 and dropped into a center section of the holding box 57. A fiber angled chute 59 now forces the fibers 42 against an angled drive belt 60. This action provides for mixing and compacting the fibers 42 thoroughly for proper weight and density, thus forming a blended fiber pad 62. The compacted fiber pad 62 is now discharged onto a horizontal conveyor belt 63. The belt 63 includes multiple weigh cells that electronically signal for adjusting the weight and density of the pad 62 as it enters into to a three compartment, gas fired, oven.

Figure 8:
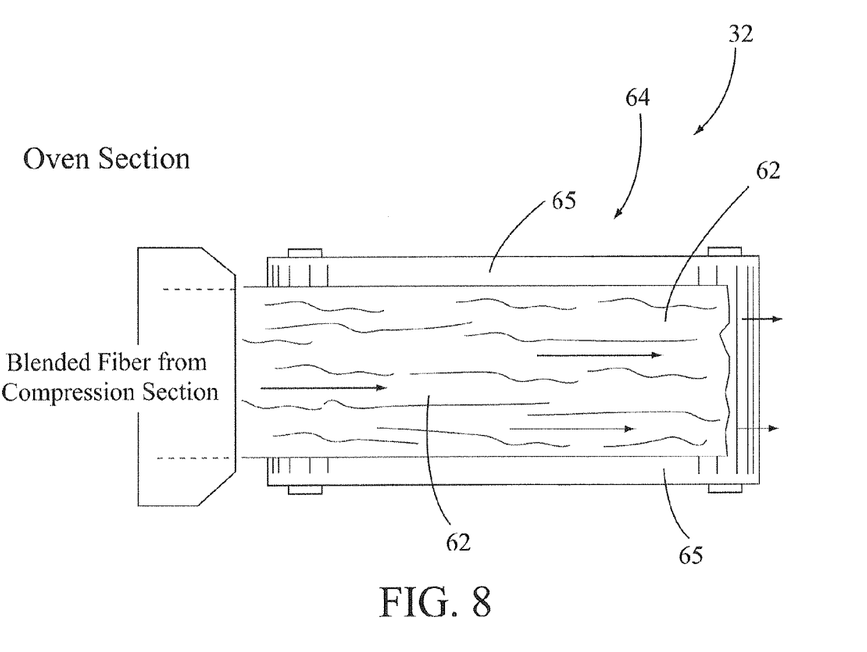
FIG. 8 is a top view of an oven section for heating and activating the low melt bond material, which is blended with the mixture of the alpaca fibers and the selected natural fibers.

In FIG. 8, a top view of an oven section is shown for heating and activating the low melt bond material 40 blended with the fiber mixture 12. The oven section is shown having general reference numeral 64. The oven section 64 includes a oven conveyor belt 65 for moving the fiber pad 62 along a length of the oven section. At this time, the low melt bond material 40 is heat activated in a range of 300 to 350 degrees F. for creating a bond with the fiber mixture 12 and forming the blended fiber pad 62.

Figure 9:
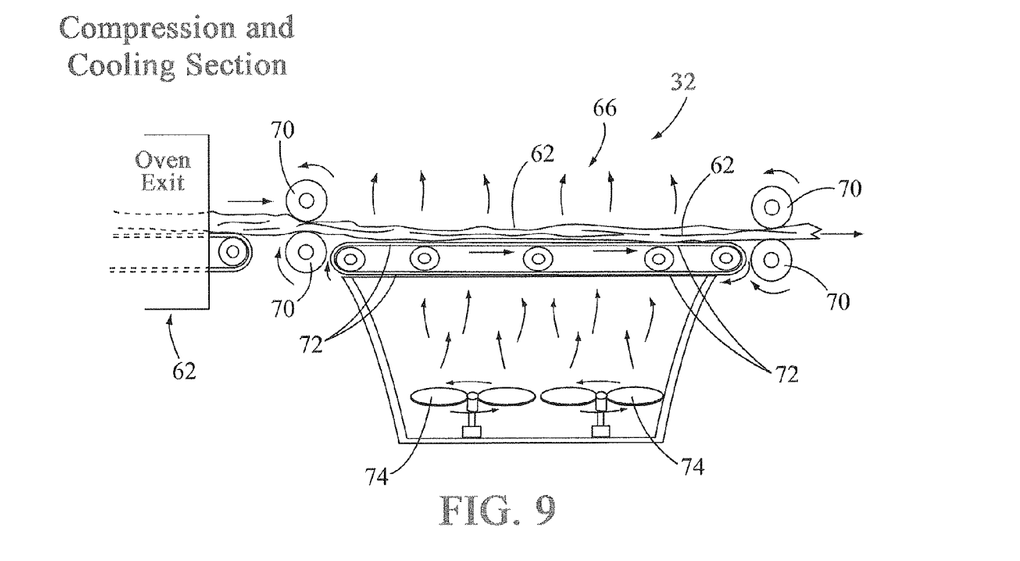
FIG. 9 illustrates a compression and cooling section used to chill the fiber pad from the oven section and lock in a correct height of the pad and for blowing cool air into the pad to eliminate false loft.

In FIG. 9, a compression and cooling section, having general reference numeral 66, is used with compression rollers 70 and a conveyor belt 72 to lock in a correct height of the fiber pad 62. Also, fans 74 are used to chill the pad 62 by blowing cool air through the pad and eliminate false loft.

Figure 10:
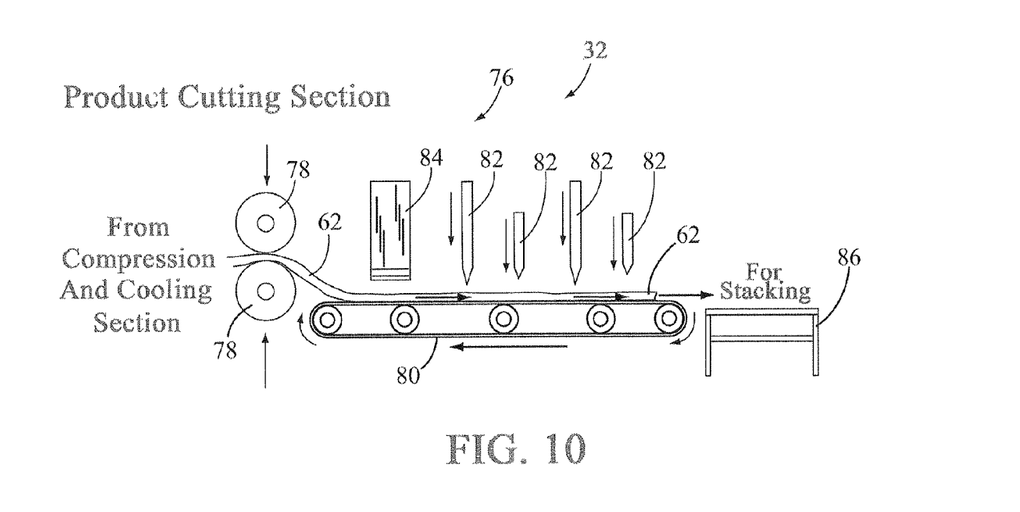
FIG. 10 shows a product cutting section for cutting the pad to a desired length and width.

In FIG. 10, a product cutting section, having general reference numeral 76, is shown for cutting the blended fiber pad 62 to a desired length and width. The cutting section 76 includes feed rollers 78 and a conveyor belt 80 for feeding the pad 62 past four cutting blades 82 for cutting a 80 inch wide pad into four 20 inch wide pads. Also, a cross cut guillotine knife 84 is shown for cutting the pad length wise. The cut pad 62 is then received on a stacking table 86 at the end of the conveyor belt 80.

Once the blended fiber pad 62 is cut to size, it can be quilted, used as a filling pad, or used in conjunction with other products, such as furniture, box springs, foam padding, and other sleeping surfaces.

While the invention has been particularly shown, described, and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A system for creating a blended fiber pad made from a combination of an alpaca fiber and a selected fiber, the blended fiber pad used for bedding products, cushions, toppers and furniture, the system comprising:
   a washing station for cleaning and drying the alpaca fiber and the selected fiber;
   a pad forming machine including a plurality of sections, the machine including:
   a blending section for receiving the dried alpaca fiber and the selected fiber and blending the alpaca fiber and the fiber with a low melt bond material;
   a pad compression section for receiving the blended alpaca fiber and selected fiber with the bond material and compressing the blend into a blended fiber pad, the pad compression station adjusting the fiber pad to a desired thickness and fullness;
   a oven section for heating and activating the bond material for bonding with the alpaca fiber and the selected fiber in the fiber pad;
   a compression and cooling section for cooling the fiber pad and adjusting the height of the fiber pad; and
   a product cutting section for cutting the fiber pad to a desired length and width.

2. The system as described in claim 1 wherein the washing station includes a series of wash tanks, squeeze pads and drying racks.

3. The system as described in claim 1 further including an opener section for stretching and opening the alpaca fiber and the selected fiber and removing any remaining dirt and debris left therein after the dried alpaca fiber and the dried natural fiber is received from the washing station.

4. The system as described in claim 1 further including a stacking section used for storing the alpaca fiber, the selected fiber and bond material in a non-compression state and prior to introducing a mixture of the alpaca fiber and the selected fiber with the bond material to the pad compression station.

5. The system as described in claim 1 wherein the oven section heats the low melt bond material in a range of 300 to 350 degrees F. for creating a bond with the alpaca fiber and the selected fiber.

6. The system as described in claim 1 where the low melt bond material is blended in a range of 5 to 15 percent of the volume of the mixture of the alpaca fiber and selected fiber in the blending section.

7. The system as described in claim 1 wherein the alpaca fiber is blended in a range of 10 to 90 percent of the volume of the fiber mixture in the blending station.

8. The system as described in claim 1 wherein the selected fiber is blended in a range of 10 to 90 percent of the volume of the fiber mixture in the blending station.

9. The system as described in claim 1 wherein the selected fiber is a natural animal fiber of angora, camel, cashmere, llama, mohair, silk, vicuna, wool or yak.

10. The system as described in claim 1 wherein the selected fiber is a natural plant fibers of bamboo, cotton, hemp, jute, kenaf, sisal, flax, linen or ramie.

11. The system as described in claim 1 wherein the selected fiber is a man-made filament fibers, such as acrylic, nylon, polyester, lyocell, rayon or viscose.

12. A system for creating a blended fiber pad made from a combination of alpaca fiber and a selected fiber, the selected fiber can be a natural animal fiber, a natural plant fiber, or a man-made filament fiber, the pad used for bedding products, cushions, toppers and furniture, the system comprising:
   a washing station for cleaning and drying the alpaca fiber and the selected fiber;
   a pad forming machine including a plurality of sections, the machine comprising:
   a blending section for receiving the dried alpaca fiber and the dried selected fiber and blending the alpaca fiber and selected fiber with a low melt bond material;
   a pad compression section for receiving a blend of the alpaca fiber and selected fiber with the bond material and compressing the blend into a blended fiber pad, the compression section including a holding box with compression rollers, a fiber angled chute and an angled drive belt, the fiber angled chute forcing the fibers against the drive belt for mixing and compacting the fibers for proper weight and density, the pad compression section also adjusting the fiber pad to a desired thickness and fullness;
   a oven section for heating and activating the bond material for bonding with the alpaca fiber and the selected fiber in the fiber pad;
   a compression and cooling section for cooling the fiber pad and adjusting the height of the fiber pad; and
   a product cutting section for cutting the fiber pad to a desired length and width.

13. The system as described in claim 12 wherein the washing station includes a series of hot water wash tanks, squeeze pads and drying racks for thoroughly washing and drying the alpaca fiber and the selected fiber.

14. The system as described in claim 12 further including an opener section with spiked and gauged opener conveyor belts, the belts used for stretching and opening the alpaca fiber and selected fiber and removing any remaining dirt and debris left therein after the dried alpaca fiber is received from the washing station.

15. The system as described in claim 12 further including a stacking section used for storing the alpaca fiber, the selected fiber, and the bond material in non-compression state and prior to introducing a mixture of the fibers to the fiber compression station.

16. A method for creating a blended fiber pad from alpaca fiber and a selected fiber, the pad used for bedding products, cushions, toppers, and furniture, the steps including:
   washing the alpaca fiber and the selected fiber in a washing station for cleaning and drying the fibers;
   introducing the mixture of fibers in a pad forming machine, the pad forming machine including a plurality of sections as follows;
   receiving the dried alpaca fiber and dried selected fiber in a blending section and blending the fibers with a low melt bond material;
   compressing the blended fibers with the bond material into a blended fiber pad in a pad compression section, the pad compression section adjusting the fiber pad to a desired thickness and fullness;
   heating and activating the bond material for bonding with the blended fibers in the fiber pad in an oven section;
   compressing and cooling the fiber pad and adjusting the height of the fiber pad in a compression and cooling section; and
   cutting the fiber pad to a desired length and width in a product cutting section.

17. The method as described in claim 16 wherein the step of washing the alpaca fiber and the selected fiber includes washing the fibers in a series of hot wash tanks and using squeeze pads and drying racks.

18. The method as described in claim 16 wherein an opener section is used for stretching and opening the alpaca fiber and the selected fiber and removing any remaining dirt and debris left therein after the dried alpaca fiber and the selected fiber are received from the washing station.

19. The method as described in claim 16 further including storing the alpaca fiber and the selected fiber and bond material in a non-compression state in a stacking section and prior to introducing a mixture of the fibers and bond material to the fiber compression station.

20. The method as described in claim 16 wherein the oven section is used for heating the low melt bond material in a range of 300 to 350 degrees F. for creating a bond with the alpaca fiber and the selected fiber.

\* \* \* \* \*